April 9, 1968 R. J. HARRIS 3,376,896
THREE-IN-ONE HIGH TEMPERATURE VALVE
Filed Sept. 22, 1964
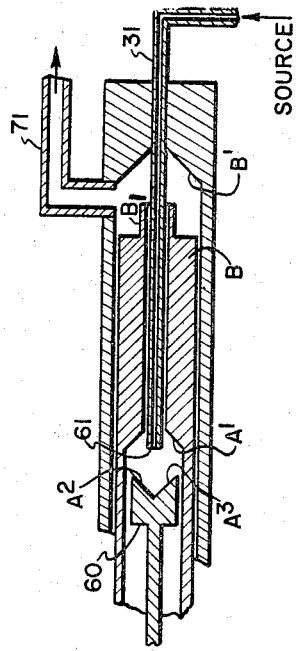
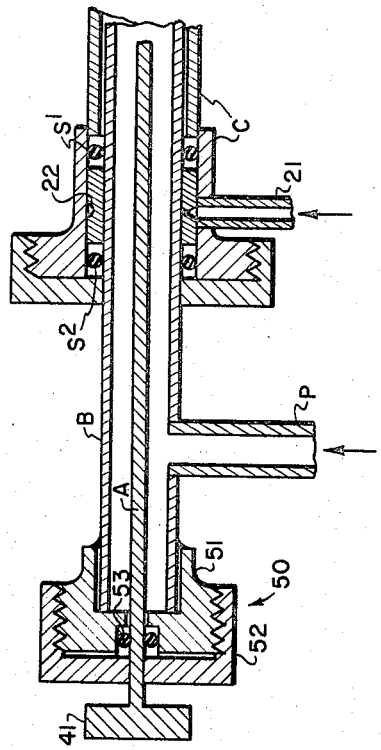
RANO J. HARRIS, INVENTOR
BY
*Edwin M. Thomas*
ATTORNEY

# United States Patent Office 3,376,896
Patented Apr. 9, 1968

3,376,896
THREE-IN-ONE HIGH TEMPERATURE VALVE
Rano Joseph Harris, Baton Rouge, La., assignor to Esso Research and Engineering Company, a corporation of Delaware
Filed Sept. 22, 1964, Ser. No. 398,208
3 Claims. (Cl. 137—637.2)

ABSTRACT OF THE DISCLOSURE

A valve for the control of high temperature gases includes sealing means physically and thermally isolated from the high temperature gases by supplying a cool fluid under positive pressure into the hot gas stream being controlled. Means are also included to provide a positive or negative pressure to a sliding seal of the valve to pressure balance said seal and prevent leakage therethrough.

---

The present invention relates to a three-in-one valve for high temperature service. It is particularly suitable for use at temperatures of several hundred degrees, for example temperature of the order of 300 to 400° C. or more. In a broader aspect, however, the invention is designed to protect temperature sensitive sealing elements between valve parts from adverse temperature effects either hot or cold. The valve is particularly suitable for gases and for most vapors. It can also handle small quantities of hot liquid, provided that the heat content of the liquid is not great enough to destroy the packing or gaskets.

Because of the location and character of gaskets and other packing or sealing materials, etc., such as are normally used in valve structures, it is often difficult to operate prior art valves of this general type. This is especially true at elevated temperatures. It is particularly true of valves used in connection with relatively small but very hot streams of gases and vapors, such as those which pass to and from control instruments. The gasket materials commonly employed are made of rubber or analogous organic materials which tend to decompose or deteriorate at elevated temperatures or at least to become ineffective for their intended purposes.

In chemical plants and refineries, it is frequently necessary to connect various instruments, such as gas chromatograph instruments, mass spectrometers and the like, to the high temperature equipment itself or to larger lines through which high temperature fluids are passing in quantity. There is a serious need for valves that can operate at high temperatures and can be shut off completely and independently to control flow from the various inlets and outlets to which they are connected. Flow of vapors and gases into and out of instruments, which often must operate at critical high pressures as well as high temperatures, presents a particular problem. This is especially true of mutiple valve structures.

The valve of the present invention is a triple seated valve. It is so designed that one stem, or valve element, and one seat pair controls the flow of high temperature fluid from a first source. Another valve and seat pair is designed to control flow to a final, or second, receiver, such as another analytical instrument. Still another pair, valve and seat, is adapted to control flow from a pump so that the fluid may be moved at proper pressure.

While the valve of this invention can be used for various purposes, it is particularly suitable for use in flow control from a gas chromatograph to a mass spectrometer. The chromatograph, of course, may be of any suitable type. The mass spectrometer also may be any of several types, such as, for example, a time of flight mass spectrometer. In studying plant control, by a combination of gas chromatography and mass spectrometry, the valve of this invention has been found to be particularly helpful because it has eliminated many side effects that have been found in other valves. However, it will be understood that the valve may be used in various ways and for various purposes.

It is a particular object of the present invention to get a clean and complete cutoff for each stream passing through the valve without employment of elements which are subject to early failure at high temperatures. A further object is to design a valve adapted to operate and control flow in the various lines at the precise pressures desired. Another object is to design an elongated valve structure with temperature sensitive seal means near one end, and valve and seat elements which are not particularly sensitive near the other end, so that gases at extreme temperatures flowing through the valve do not substantially communicate their effects to said seal means. These objects and other related thereto will more clearly appear by reference to a specific and detailed description of a presently preferred modification of the invention, which is illustrated in the accompanying drawing but is only exemplary.

Referring to the drawing, the valve is shown in a vertical longitudinal sectional view. It comprises a main body C in the form of a hollow tube carefully dimensioned, which is adapted to receive interiorally a slidable tube B. The latter is sealed with respect to gas flow by a pair of circumferential seals, S1 and S2. These seals may be conventional rubber or plastic members in the form of O rings or equivalent structures of known type. Between these seals, a pump line 21 is provided which communicates with an annualr groove 22 spaced more or less midway between the two seals, S1 and S2. By applying vacuum (or pressure) to the line 21 at approximately the degree of vacuum (or pressure) existing in the system between tubes B and C, as will be obvious, air may be prevented from leaking therein past one or the other of the seals S1 or S2. In other words, it is desirable to attach line 21 to a source matching the pressure of the space between tubes B and C so that a minimum pressure differential exists across seal S1.

The main valve body C receives at its right end a line which is tightly sealed therein, indicated at 31. It may be threaded or brazed, etc., but must be fluid tight at high operating temperature. In a typical operation, this line will bring in gas to be tested from a suitable source, for example from a gas chromatograph. This gas, or vapor, may be at a high temperature which would damage seal elements such as S1 and S2 if brought past them. The gas or vapor will already have been analyzed for content of certain components. As shown in the drawing, the valve body C has a conical seat B' which surrounds the tube 31. This seat is adapted to be closed at a suitable time by a carefully fitted valve closure element B1. The surfaces of B' and B1 may be lapped and ground to assure a tight seal when the valve B1 is pressed against seat B'.

The tube 31 extends freely and slidably through an opening in the movable tubular member B which also is longitudinally slidable and freely movable within the valve body C. The member B may be considered to be both a valve stem and a pump line. A pump P is connected to the line B as indicated at the left in the drawing. The arrangement is such that the tube or stem member B may be moved to the right or the left within valve body member C through any conventional flexible tubing means (not shown) without disturbing the connection to the pump.

Within the hollow tube or stem B is located another freely slidable valve stem or valve element A. This member A not only is slidable within the member B but it has an operating or control element 41 at the left of the cap element 50 of the tube, or stem B, through which an extension of element A projects and is slidable. Cap 50 is comprised of two parts, an inner threaded member 51 which is welded in gas tight relation to the tube B, and an outer member 52 which screws onto element 51 in such a way as to contain a gas tight seal 53 of suitable material and design, such as a rubber or plastic O ring, or a suitable impregnated fiber seal, which surrounds the stem of element A and prevents gas passing to or from the atmosphere around the valve stem A. At its right end, the valve stem A is provided with a hollow conical end structure 60 which comprises both a valve seat A3 and a male valve closure element A2. Valve element A2 is adapted on its outer rim to seat against the valve seat A' formed in member B. The inner part of the hollow cone is carefully ground to form the seat A3 which matches exactly in gas tight relationship when closed against the left end of the tube 31, which thereby forms a male valve element 61.

The operation of the valve will be reviewed briefly. By movement of element A within B and by movement of element B within the body C, the various valves and valve seats may be brought into closed relationship, as desired, there being no organic materials, such as rubber O rings or equivalent seals near the actual valve closure elements that are likely to be adversely affected by the high temperatures of the fluids passing through the valve elements. High temperature fluids do not pass leftward of element 60, as shown in the drawing, because of a positive pressure from pump P. The elements A, B and C may be made quite long so that the temperature at seals S1, S2, etc., never gets very high. The length will depend inversely on the thermal conductivity of the metal. For this reason, a metal of low thermal conductivity such as stainless steel or nickel-copper alloys are preferred. The seals, S1 and S2 and 53, then are all quite remote from the valve surfaces and are not subjected to high temperatures. Movement of cooler fluid from pump P past the seals and on to the right helps keep their temperatures down. Thus the seals are kept at moderate temperatures even when the valve elements are at temperatures of 300 to 400° C., or higher.

By lapping or grinding the end elements of A2, seat A', 61, A3 element, B1, seat B', etc., it is possible to obtain a very precise flow control with the valve of this invention. The device may be considered a splitting valve which will operate with high accuracy at very high temperatures. It has three points of control. Three points of control are necessary, of course, in controlling the flow of gas to critical pressure operated instruments, such as those mentioned above. It will be understood that other instruments, and particularly various types of gas chromatographs and mass spectrometers, may be used in connection with the valve of this invention.

Assuming that a gas is coming from the gas chromatograph, as indicated at the right in the drawing, it will flow through line 31 into the open valve A2, 61. Thence, because of relatively positive pressure from pump P, the gas will flow back to the right around the tube 31, which is not in gas-tight sealed relationship with respect to element B. The gas will pass directly to the mass spectrometer through line 71. When the system is operating on gases, reduced pressure will normally be applied to the system through the pump line P, at the left, so as to drive the gas to or through the mass spectrometer. The reason for this is that the instruments usually operate at very low pressure, i.e., under vacuum. Now, by operating the stem B, moving valve B1 into contact with its seat B', the flow to the mass spectrometer is stopped. By moving the inner stem A to the right, the valve A2 is closed against seat A' and at the same time the seat A3, within the conical end of valve element A, is brought into closed position against the element 61 at the end of the tube 31. The latter forms the male valve element. By this means all three valve pairs may be brought into closed position. Either pressure or suction may be applied to line 21, as desired, to prevent air getting into the system, depending on the relative pressures inside and outside the apparatus. Pump P normally will be operated as a vacuum pump.

It will be seen that by confining the gases passing through the valve elements near one end of the elongated body, and locating the temperature sensitive seal elements near the other end, substantial temperature effects from fluids passing through the valve element will not be communicated to the seal elements, even if the gases are at extreme temperatures. By using positive means, such as pump P, to move the hot gases away from the seals, the heat flow to parts that might be damaged thereby may be reduced even more. It will also be understood that the particular arrangement illustrated of the respective closure elements is not always necessary to the proper functioning of the valve. Certain parts may be interchanged and modified, as will be obvious to those skilled in the art.

What is claimed is:
1. A three seated, three valve structure for accurate control of gas streams comprising:
   (a) an elongated valve body member having a cylindrical bore therein terminating in a first conical valve seat at one end of said body member;
   (b) an intermediate tube member slidably mounted within the bore of said body member; said tube member having (i) at one end a closure member cooperative with said first valve seat, and (ii) a cylindrical interior bore having a second conical valve seat;
   (c) an inlet nozzle being sufficiently long to extend interiorly along the axis of said body member through said first conical valve seat and said second conical valve seat, said nozzle terminating in the interior bore of said tube member; and
   (d) an elongated stem member extending longitudinally within the cylindrical bore of said tube member and including an inverted conical valve body at one end thereof, said valve body being axially operable to seat upon and close the inlet nozzle, or seat upon, the second conical valve seat of said tube member, said valve body being also operable upon axial movement thereof relative to said tube member and inlet nozzle to simultaneously seat upon said nozzle and said second conical valve seat.

2. The combination of claim 1 including seal means between said body member and the tube member, and between said tube member and stem member at points remote from said first and second conical valve seat.

3. The combination of claim 2 including means for supplying a relatively cool gas to said seal means to prevent subjecting said seal means to high temperature.

References Cited
UNITED STATES PATENTS

| | | | |
|---|---|---|---|
| 3,070,126 | 12/1962 | Schneider | 137—637.2 |
| 1,360,431 | 11/1920 | Holas | 137—637.2 |
| 2,332,150 | 10/1943 | Huff | 277—22 |
| 2,682,277 | 6/1954 | Marshall | 73—421.5 |

WILLIAM F. O'DEA, *Primary Examiner.*

W. H. WRIGHT, *Assistant Examiner.*